United States Patent [19]

Inui et al.

[11] 4,429,356
[45] Jan. 31, 1984

[54] TRANSISTOR INVERTER DEVICE

[75] Inventors: Kenichi Inui, Yokohama; Hisao Kobayashi, Fujisawa; Tadao Funabashi, Atsugi, all of Japan

[73] Assignee: Toshiba Electric Equipment Corporation, Tokyo, Japan

[21] Appl. No.: 334,816

[22] Filed: Dec. 28, 1981

[30] Foreign Application Priority Data

Dec. 26, 1980 [JP] Japan .................................. 55-186081

[51] Int. Cl.³ .............................................. H02H 7/122
[52] U.S. Cl. .................................... 363/56; 315/209 T; 363/97
[58] Field of Search ................... 315/209 T, 224, 226, 315/DIG. 2, DIG. 7; 363/56, 97, 133

[56] References Cited
U.S. PATENT DOCUMENTS 3,200,348  8/1965  Kammiller et al. ............... 363/56 X
3,335,316  8/1967  Schneider ......................... 363/56 X
4,277,726  7/1981  Burke ........................... 315/DIG. 7 X Primary Examiner—William M. Shoop
Attorney, Agent, or Firm—Oblon, Fisher, Spivak, McClelland & Maier

[57] ABSTRACT

Base current is supplied from a base driving circuit to bases of paired inverter transistors through a transistor, and an inverter circuit oscillates at a rated output. When the operation of an electric discharge lamp becomes abnormal, an IC-ed control circuit is rendered operative responsive to output of an abnormality detecting circuit to turn the transistor ON and a transistor OFF, and the operation of inverter circuit is thus stopped. A capacitor in an auxiliary power source is charged by output of the base driving circuit and the control circuit is driven responsive to output of auxiliary power source when the inverter circuit is left inoperative.

6 Claims, 1 Drawing Figure

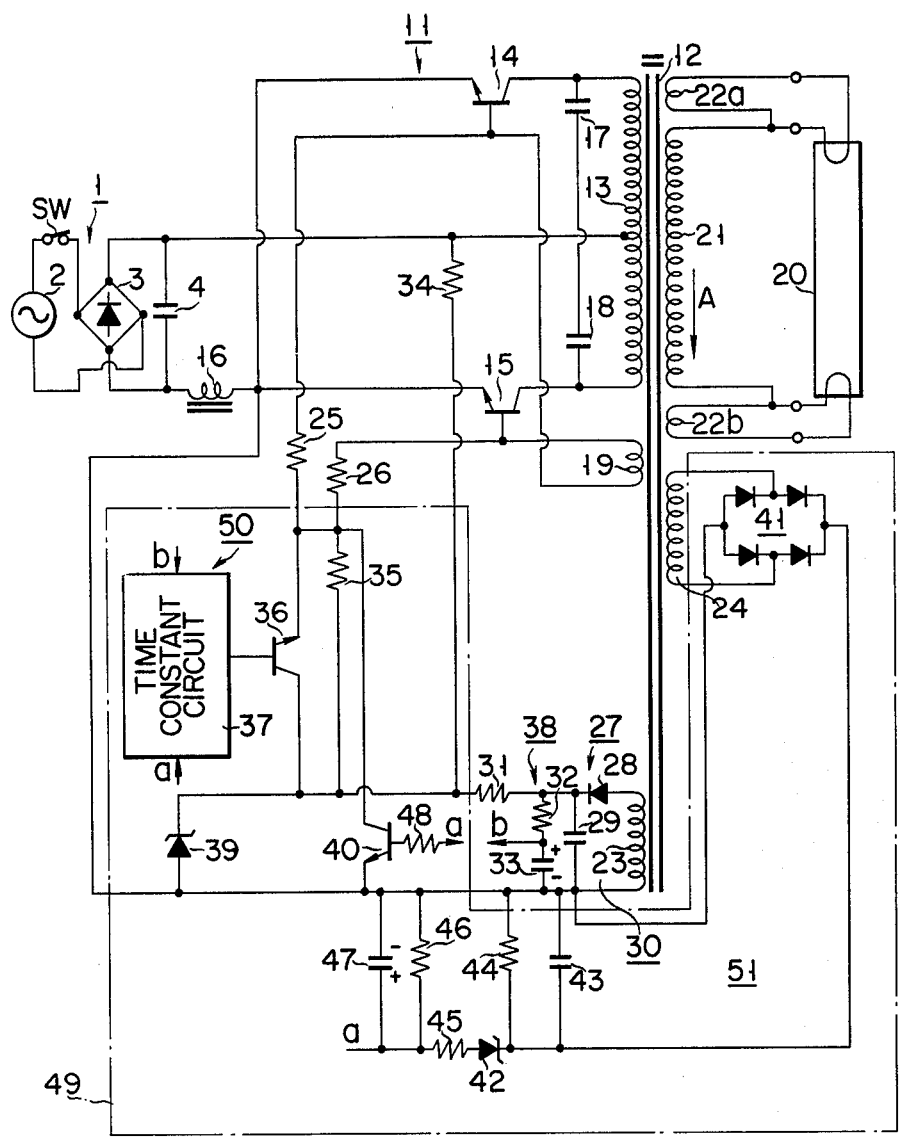

TRANSISTOR INVERTER DEVICE

BACKGROUND OF THE INVENTION

The present invention relates to a transistor inverter device in which a circuit is incorporated to control the operation of an inverter when output of this inverter becomes abnormal.

The output of the transistor inverter device varies in accordance with an abnormal state of a load or that of itself. In the case where the operation of an electric discharge lamp is achieved using output of transistor inverter device, for example, discharge is not carried out normally when the end of the life of this electric discharge lamp approaches, and an abnormal state also occurs on an output of the transistor inverter device to which the electric discharge lamp is connected as a load. When this state is left as it is, there is a fear that elements such as transistors, an output transformer and the like constituting the transistor inverter device are damaged. A control circuit for detecting abnormality of the transistor inverter device and stopping the operation of inverter is employed to prevent transistors and the output transformer from being damaged. This control circuit is asked to be constructed as an integrated circuit for the purpose of making the arrangement of device simple and the cost thereof low and attaining high reliability. This circuit integration will be referred to as "IC-ed" in this specification. When the control circuit is formed using the IC, a power source is generally needed to render this IC operative. It is imagined that rectified and smoothed output of transistor inverter circuit is used as this power source. When abnormality is detected and the operation of transistor inverter device is stopped in this case, however, the control circuit comprised of semiconductor integrated circuits is also turned off, thus making it impossible to attain desired control operation. On the other hand, when a different power source is arranged only for use to the control circuit, it undesirably makes the device complicated and the cost thereof high.

SUMMARY OF THE INVENTION

The object of the present invention is therefore to provide a transistor inverter device in which an control circuit comprised of semiconductor integrated circuits, can be powered from a transistor inverter circuit of the inverter device to achieve stable operation.

According to the present invention, this object can be attained by a transistor inverter device comprising a power source section, a transistor inverter circuit for generating high frequency output and including at least one transistor repeatedly turned on and off responsive to output of power source and an output transformer to which current flowing through these transistors is supplied, a base driving circuit for supplying a driving output obtained by rectifying a part of high frequency output of transistor inverter circuit to a base of the transistor, a control circuit including a means for detecting that output of transistor inverter circuit is abnormal state and bringing the driving circuit inoperative with respect to the transistor inverter circuit when abnormal state is detected, and an auxiliary power source charged by output of driving circuit and supplying operating voltage to the control circuit.

BRIEF DESCRIPTION OF THE DRAWING

The drawing is a circuit diagram showing an example of transistor inverter device according to the present invention.

DETAILED DESCRIPTION OF THE PREFERRED EMBODIMENT

A power source section 1 has a commercial AC power source 2 and a full-wave rectifier circuit 3 for receiving and rectifying AC 100 V of 50 Hz, for example, supplied from the AC power source 2 through a power source switch SW. Between output terminals of full-wave rectifier circuit 3 is connected, if necessary, a noise preventing capacitor 4. The positive output terminal of rectifier circuit 3 is connected to the center tap of a primary winding 13 of an output transformer 12 in a transistor inverter circuit 11, and both ends of primary winding 13 are connected commonly to an end of a constant current inductor 16 through switching transistors 14 and 15, respectively. The other end of inductor 16 is connected to the negative output terminal of rectifier circuit 3. A series circuit consisting of two resonance capacitors 17 and 18 is further connected to both ends of primary winding 13.

In the output transformer 12 are further arranged a feedback winding 19, a secondary winding 21 to which an electric discharge lamp 20 is connected as a load, preheating windings 22a and 22b for heating the filaments of electric discharge lamp 20, a base winding 23 and an abnormality detecting winding 24.

The feedback winding 19 serves to feed back output of inverter circuit 11 to bases of transistors 14 and 15. One end of winding 19 is connected to the base of transistor 14 and one end of a resistor 25 while the other end thereof to the base of transistor 15 and one end of a resistor 26.

The base winding 23 forms a part of a driving circuit 27, and a diode 28 and a capacitor 29 are connected between both ends of base winding 23 to form a rectifying and smoothing circuit 30. The positive output terminal of rectifying and smoothing circuit 30 is connected to the junction point between resistors 31 and 32 while the negative output terminal thereof to the other end of resistor 32 through a capacitor 33. The other end of resistor 31 is connected to the positive output terminal of rectifier circuit 3 through a resistor 34, while to the junction point between the other ends of resistors 25 and 26 through a resistor 35. A transistor 36 is connected parallel to the resistor 35. To the base of transistor 36 is connected to output terminal of a time constant circuit 37, to which is supplied output of an auxiliary power source 38 from the junction point between the resistor 32 and the capacitor 33. The other end of resistor 31 is further connected via a Zener diode 39 to the negative output terminal of rectifying and smoothing circuit 30 and one end of inductor 16. The emitter side of transistor 36 is connected via a transistor 40 to the negative output terminal of circuit 30.

The abnormality detecting winding 24 is connected to the output terminal of a full-wave rectifier circuit 41. The negative output terminal of rectifier circuit 41 is connected to the negative output terminal of rectifying and smoothing circuit 30 while the positive output terminal thereof to one end of each of cathode of a Zener diode 42, a capacitor 43 and a resistor 44. The other ends of capacitor 43 and resistor 44 are connected to the negative output terminal of rectifying and smoothing circuit 30. The anode of Zener diode 42 is connected via a resistor 45 to one end of each of a resistor 46 and a capacitor 47, whose other ends are connected to the negative output terminal of rectifying and smoothing circuit 30. The common junction point between resistors 45, 46 and the capacitor 47 is connected via a resistor 48 to the base of a transistor 40 and the power source terminal of time constant circuit 37.

The portion enclosed by a dot-and-dash line in the drawing represents an control circuit 49, comprised of semiconductor integrated circuits, where are arranged a soft start circuit 50 including the transistor 36 and time constant circuit 37, an abnormality detecting circuit 51 including the full-wave rectifier circuit 41 and Zener diode 42, and a stopper circuit including the transistor 40 for stopping the operation of inverter circuit 11 responsive to output of abnormality detecting circuit 51. When the control circuit 49 is comprised of semiconductor integrated circuits, the elements shown in the figure are not used in the IC as they are, but those designed suitable to the IC are generally used.

When the power source switch SW is turned on, AC input supplied from the commercial AC power source 2 is full-wave-rectified by the rectifier circuit 3 and DC voltage is applied to the inverter circuit 11. Thanks to DC voltage applied, a little base current is supplied to bases of transistors 14 and 15 through resistors 34, 35, 25 and 26 in this order, one of transistors 14 and 15 is turned ON. When the transistor 14 is turned ON, for example, current flows from the center tap of primary winding 13 of output transformer 12 through the transistor 14. As the result, voltage forwardly biasing transistor 14 is generated, thus rendering transistor 14 more conductive. On the other hand, a resonance circuit consisting of output transformer 12 and resonance capacitors 17 and 18 operates. When the polarity of resonance voltage thereof becomes inverse, the voltage on the feedback winding 19 also becomes inverse. Accordingly, the transistor 14 is turned ON while the transistor 15 OFF. Similarly, the inverter circuit 11 generates predetermined high frequency output (for example, 1 kHz to 100 kHz), and high frequency output is generated in each of secondary winding 21, preheating windings 22a, 22b, base winding 23 and abnormality detecting winding 24.

Immediately after (0.5 second to 2 seconds, for example) the closure of switch SW, the output of time constant circuit 37 is not supplied to the base of transistor 36 and the transistor 36 is left OFF, so that the base current of transistors 14 and 15 supplied through the resistor 35 having a relatively large value is therefore kept a small value. As the result, output of inverter circuit 11, that is, output generated in the secondary winding 21 is small and does not have a value sufficient to start the discharge lamp 20. Therefore, the electric discharge lamp 20 is not operated but the filaments thereof are only preheated.

High frequency output generated in the base winding 23 is rectified and smoothed by the rectifying and smoothing circuit 30 and the capacitor 33 is charged by DC voltage thus formed. Voltage charged to the capacitor 33 is lead out of junction point between the resistor 32 and the capacitor 33 and supplied to the time constant circuit 37. The time constant circuit 37 supplies output to the base of transistor 36 in the soft start circuit 50 after a predetermined time period and the transistor 36 is turned ON. When the transistor 36 is turned ON, output of driving circuit 27 is supplied through the transistor 36 to bases of transistors 14 and 15. This causes the inverter circuit 11 to supply rated output to the electric discharge lamp 20, which is thus operated. When the electric discharge lamp 20 is normal, discharge currents alternately flowing through the electric discharge lamp 20 in reverse directions responsive to ON-OFF of transistors 14 and 15 have substantially the same value. Therefore, pulsations picked up every half wave through the abnormality detecting winding 24 and full-wave rectifier circuit 41 have substantially the same amplitude less than Zener voltage of Zener diode 42, thus leaving the abnormality detecting circuit 51 inoperative.

When the end of the life of electric discharge lamp 20 approaches under this state, for example, the electric discharge lamp 20 is shifted from the condition under which discharge is alternatively reversed every half wave of output of inverter circuit 11 to an abnormal condition under which discharge is only carried out every other half wave with a half wave interposed therebetween. This is so-called as a half wave discharge condition. Discharge is carried out from the filament winding 22b to the one 22a, for example, but almost no discharge is allowed in the reverse direction. As the result, the core of transformer 12 is differently magnified when current flows through the secondary winding 21 in the direction shown by an arrow A and when it flows in the reverse direction, and deviation in magnification is thus caused. Because of this magnetic deviation, voltage generated in the secondary winding 21 at every half wave comes to have different values and abnormal voltage is thus generated. Namely, voltage of half wave generated in the direction in which the core of transformer 12 is more strongly magnified comes to have a value larger than that under normal condition and pulsations obtained through the abnormality detecting winding 24 and full-wave rectifier circuit 41 come to exceed in voltage Zener voltage of Zener diode 42. The abnormality detecting circuit 51 is thus made operative and abnormality detecting output applied through the Zener diode 42 is charged to the capacitor 47 in the direction shown. The transistor 48 is turned ON due to voltage charged in the capacitor 47 and an output inverting circuit (not shown) provided in the time constant circuit 37 is driven at the same time, so that base bias of transistor 36 is changed in the direction in which the transistor 36 is turned OFF. A one-stage transistor inverter circuit may easily be used as the output inverter circuit. When the transistor 36 is turned OFF and the transistor 40 ON, emitters and bases of switching transistors 14 and 15 become substantially short-circuited through the transistor 40 and small resistors 25, 26, and the oscillating operation of inverter circuit 11 is stopped. The electric discharge lamp 20 is thus turned off. Even if the end of the life of electric discharge lamp 20 approaches and abnormal voltage is generated in the secondary winding 21, the electric discharge lamp 20 is kept operated for a time period corresponding to half one cycle of high frequency inverter output till oscillation of inverter circuit 11 is stopped. When oscillation of inverter circuit 11 stops, the transistor 36 is turned OFF and the short circuit consisting of transistor 36 and transistor 40 is not formed. Therefore, charged voltage in the capacitor 33 of driving circuit 27 is kept not-discharged. Even if no output is applied from the inverter circuit 11, therefore, operating voltage can be supplied from the driving circuit 27 to the control circuit 49 for a prescribed period of time.

When no output is applied from the inverter circuit 11, voltage is not supplied from the abnormality detecting circuit 51 to the capacitor 47 and charge in the capacitor 47 is discharged through the resistor 46. The transistor 36 is turned ON since output of driving circuit 27 is supplied to the time constant circuit 37 and when one of transistors 14 and 15 is turned ON, output is again supplied from the inverter circuit 11 to the electric discharge lamp 20, thus starting the operation of electric discharge lamp 20 to inform that abnormality is caused. As described above, the inverter circuit 11 performs intermittent oscillating operation whose cycle is within one second, for example, to flicker the electric discharge lamp 20. The intermittent oscillating operation cycle can also be set for any desired period. The operation level of the abnormality detecting circuit 51 can be set for any desired level.

With a prior art transistor inverter device it was difficult to see whether or not an abnormal state of the electric discharge lamp is caused. However, when oscillation of inverter circuit 11 of this embodiment is stopped, the electric discharge lamp 20 is turned off and thus, the abnormal state thereof can be found clearly.

As described above, the present embodiment enables it to be informed by the intermittent operation of electric discharge lamp 20 that the end of the life of electric discharge lamp 20 approaches, and also heat damage of switching transistors 14 and 15 and the output transformer to be reduced since the inverter circuit 11 is intermittently oscillated in a certain cycle. Further, it is possible to prevent power consumption due to continuous supply over current to the discharge lamp whose life approaches to the end.

Since voltage is stably supplied from the driving circuit 27 at the time when oscillation of inverter circuit 11 is stopped, stable operation can be maintained even if the control circuit 49 is comprised of semiconductor integrated circuits. It is therefore unnecessary to employ a different power source for the control circuit, thus making it possible to provide a transistor inverter device simple in construction and cheap.

It should be understood that the present invention is not limited to the embodiment as described above and that various changes and modifications can be mode within the scope of the present invention. The soft start circuit 50 may be again conductivity-controlled by the time constant circuit at the time when the inverter circuit 11 is again operated. A semiconductor switch may be arranged between the driving circuit 27 and the collector of transistor 36 to shut off current to bases of transistors 14 and 15 in the inverter circuit 11 at abnormal time.

The soft start circuit 50 used in the described embodiment can be eliminated in this invention. In this case, it is necessary a means shutting off the circuit between driving circuit 27 and switching transistors 14 and 15.

Any desired load other than the electric discharge lamp responding to the abnormal output of the inverter circuit may be used.

It should also be understood that various changes and modifications of the control circuit 49 can be made and overcurrent may also be used for detecting the abnormality of the inverter circuit output.

What we claim is:

1. A transistor inverter device including a transistor inverter circuit having an output transformer, and a circuit for detecting the output abnormality of said transistor inverter circuit to control the operation of said transistor inverter circuit, wherein said transistor inverter device includes a base driving circuit for supplying a driving output obtained by rectifying a part of high frequency output of said transistor inverter circuit to a base of at least one switching transistor; a control circuit having means for detecting the output abnormal state of said transistor inverter circuit and separating means for bringing the driving circuit inoperative with respect to the transistor inverter circuit at the time the abnormal state is detected; and an auxiliary power source charged by output of said driving circuit to supply operating voltage to the control circuit.

2. A transistor inverter device according to claim 1, wherein said driving circuit includes a base winding arranged in the output transformer of said transistor inverter circuit, and a circuit for rectifying and smoothing high frequency voltage induced in the base winding.

3. A transistor inverter device according to claim 1, wherein said output abnormality detecting means comprises an abnormality detecting winding arranged in the output transformer of said transistor inverter circuit, a means for full-wave-rectifying high frequency output induced in the winding, a Zener diode rendered conductive when rectifying output of said means exceeds a certain value, and a capacitor charged by output of said Zener diode.

4. A transistor inverter device according to claim 3, wherein said separating means includes a first transistor turned off responsive to voltage charged in said capacitor in such a way that the first transistor is separated from the base circuit of said inverter transistors, and a second transistor turned on to short-circuit the base-emitter circuit of said switching transistor.

5. A transistor inverter device according to claim 2, wherein said auxiliary power source includes a capacitor charged by output voltage of said rectifying and smoothing circuit.

6. A transistor inverter device according to claim 1, wherein said driving circuit is comprised of semiconductor integrated circuits.

* * * * *